J. C. TERRELL.
PLOW.
APPLICATION FILED DEC. 3, 1910.
1,016,796.
Patented Feb. 6, 1912.
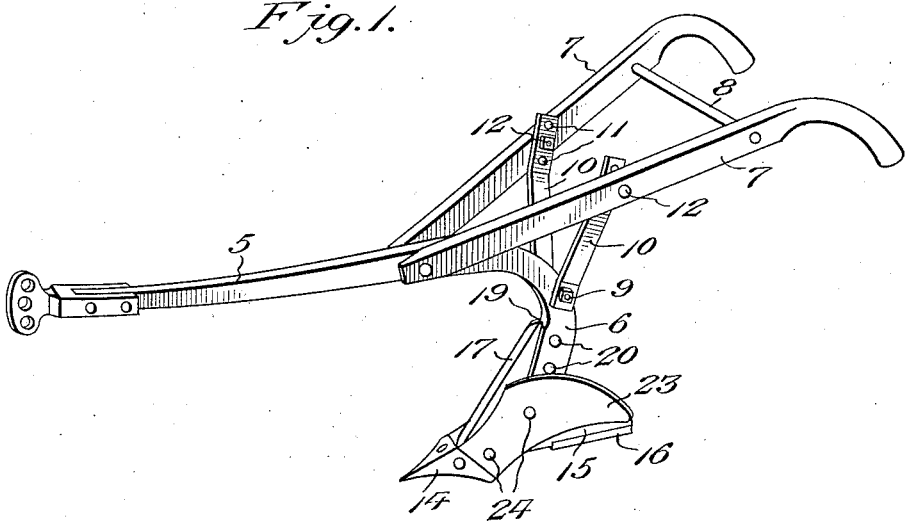
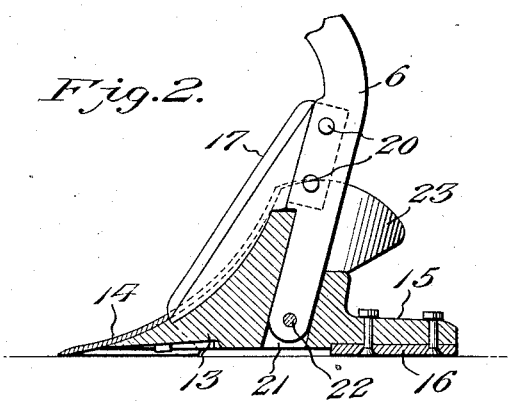
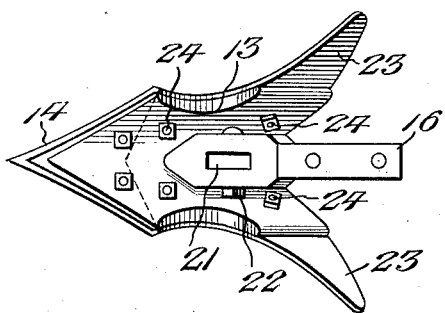
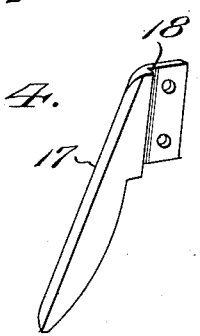
Witnesses
Edwin L. McKee
Inventor
Jasper C. Terrell
By Victor J. Evans
Attorney

UNITED STATES PATENT OFFICE.

JASPER C. TERRELL, OF MAGNOLIA, ARKANSAS.

PLOW.

1,016,796.  Specification of Letters Patent.  Patented Feb. 6, 1912.

Application filed December 3, 1910. Serial No. 595,399.

*To all whom it may concern:*

Be it known that I, JASPER C. TERRELL, a citizen of the United States, residing at Magnolia, in the county of Columbia and State of Arkansas, have invented new and useful Improvements in Plows, of which the following is a specification.

The invention relates to a plow, and more particularly to the class of sub-soil plows.

The primary object of the invention is the provision of a plow of this character in which sprouts and other foreign weeds may be severed from the ground during the breaking of the soil when the machine is advanced through a field.

Another object of the invention is the provision of a plow of this character in which a cutting blade is superposed in vertical position above the plow share, so that when the latter is opening a furrow, the earth will be cut by the blade and also weeds, so as to allow the free passage of the plow standard, and thereby will not impede the advancement of the plow when sub-soiling the ground.

A further object of the invention is the provision of a plow of this character in which the sub-soiler is provided with a heel to which is connected a shoe, the latter being adapted to work in the bed of the open furrow and thereby steady the movement of the plow during the sub-soiling operation.

A still further object of the invention is the provision of a plow in which the sub-soiler is detachably connected with the plow standard, and also the vertical cutting blade is removably held upon the standard, thus enabling the same to be detached for the re-sharpening thereof when desired.

With these and other objects in view, the invention consists of the construction, combination and arrangement of parts, as will be hereinafter more fully described, illustrated in the accompanying drawings, and pointed out in the claim hereunto appended.

In the drawings: Figure 1 is a perspective view of a plow constructed in accordance with the invention. Fig. 2 is a fragmentary vertical sectional view through the sub-soiler share. Fig. 3 is a bottom plan view of the sub-soiler, showing the shoe mounted upon the heel thereof. Fig. 4 is a perspective view of the knife blade detached from the plow standard.

Similar reference characters indicate corresponding parts throughout the several views of the drawings.

Referring to the drawings by numerals, the plow comprises a draft beam 5, the same being preferably constructed from metal, although it may be made from any other suitable material, and is provided with a downwardly and forwardly curved rear end forming the standard 6 of the beam. Connected at opposite sides of the beam 5 are rearwardly diverging guide handle bars 7, the latter being connected to the beam in any suitable manner, and are braced by the usual rung 8 connected thereto.

Rising from the standard 6 and pivotally connected thereto, as at 9, are brace irons 10, the upper ends of which are provided with a series of perforations 11, each iron 10 being detachably connected to one handle bar by means of a bolt member 12, the latter adapted to engage in any one of the perforations 11, so that the pike of the handle bars may be varied to suit the plowman.

Detachably connected to the lower end of the standard 6 of the plow beam is a sub-soiler or laterally winged steel frog 13, the same being forwardly tapered and provided at its front end with a detachable plow point 14, the lower end of which projects forwardly and in a plane below the lower surface of the frog, while the rear end of this frog is provided with a rearward extension or heel 15, to the under face of which is connected a flat shoe 16 the latter being in a plane below the under surface of the frog and in alinement with the forward end of the sub-soiling share.

Detachably connected to the plow standard above the frog 13 is a knife blade 17, the latter being formed with a rabbet 18, formed in the rear edge thereof and co-extensive for a portion of its length, and this rabbeted edge 18 fits into a recess 19 formed in the forward edge, thus alining the blade with the said standard, the cutting edge of the blade being projected forwardly of the standard. This blade is detachably secured to the standard by means of fasteners 20, and serves to cut the soil in advance of the standard, and also to sever weeds or other growing plants during the sub-soiling operation, so that the plow will not be impeded in its advancement when cutting the soil in a field. This frog 13 is formed with a socket 21 receiving the lower end of the plow standard 6, the said socket being disposed centrally within the frog, and passed through the latter and the lower end of the standard engaging in the socket is a detachable fastener 22, which latter removably secures the frog upon the standard of the plow beam.

To the winged frog 13 are detachably secured rearwardly diverging outwardly curved mold boards 23, the same being secured to said frog by means of fasteners 24 and are adapted to be detached from the said frog when the plow is to be used as a sub-soiler with the knife blade, which, as hereinbefore stated, is connected with the plow standard above the frog.

What is claimed is:

The combination with a plow beam having a depending standard, of a frog formed with a socket for receiving the said standard, a sub-soiling share detachably connected upon the forward end of the frog and projecting below the same, a cutting blade detachably connected to the standard above the frog and extending at a forward inclination to the rear end of the share, mold boards fixed to the opposite sides of the frog and overlapping a portion of the rear edge of the cutting blade, a heel plate fixed to the under surface of the frog intermediate the width thereof and projecting rearwardly therebeyond, the forward end of the said sub-soiling share and the said shoe being arranged in alinement and in a plane below the under surface of the frog.

In testimony whereof I affix my signature in presence of two witnesses.

JASPER C. TERRELL.

Witnesses:
J. G. LILE,
W. H. WABORS.

Copies of this patent may be obtained for five cents each, by addressing the "Commissioner of Patents, Washington, D. C."